(12) United States Patent
Moghaddam et al.

(10) Patent No.: US 7,647,047 B2
(45) Date of Patent: Jan. 12, 2010

(54) CONSUMER CONFIGURABLE MOBILE COMMUNICATION SOLUTION

(75) Inventors: Mehran Moghaddam, Gaithersburg, MD (US); Guido Jonjie S. Sena, Jr., Gaithersburg, MD (US); Carlos Bernardino Eleazer Perez, Gaithersburg, MD (US)

(73) Assignee: Ventraq Corporation, Gaithersburg, MD (US)

( * ) Notice: Subject to any disclaimer, the term of this patent is extended or adjusted under 35 U.S.C. 154(b) by 0 days.

(21) Appl. No.: 11/963,160

(22) Filed: Dec. 21, 2007

(65) Prior Publication Data

US 2008/0096539 A1 Apr. 24, 2008

Related U.S. Application Data

(63) Continuation of application No. 11/516,576, filed on Sep. 7, 2006.

(51) Int. Cl.
*H04Q 7/20* (2006.01)
(52) U.S. Cl. .................. 455/434; 455/433; 455/421; 455/418; 455/456.1; 455/404.1
(58) Field of Classification Search .......... 455/418, 455/456.4, 456.1, 421, 433, 434
See application file for complete search history.

(56) References Cited

U.S. PATENT DOCUMENTS

| | | | |
|---|---|---|---|
| 4,672,377 A * | 6/1987 | Murphy et al. ............ 340/5.41 |
| 6,314,291 B1 * | 11/2001 | Fujimichi .................. 455/433 |
| 6,442,406 B1 | 8/2002 | Harris et al. |
| 6,535,950 B1 * | 3/2003 | Funyu et al. ................ 711/106 |
| 6,697,842 B1 | 2/2004 | Smith et al. |
| 6,871,082 B2 | 3/2005 | Cox et al. |
| 6,915,123 B1 * | 7/2005 | Daudelin et al. ............ 455/410 |
| 6,941,134 B2 | 9/2005 | White |
| 7,197,321 B2 | 3/2007 | Erskine et al. |
| 7,218,912 B2 | 5/2007 | Erskine et al. |
| 7,263,076 B1 | 8/2007 | Leibovitz et al. |
| 7,289,617 B2 * | 10/2007 | Barnes et al. .......... 379/208.01 |
| 7,298,835 B1 | 11/2007 | Perry |
| 2002/0173339 A1 | 11/2002 | Safadi |
| 2003/0005331 A1 * | 1/2003 | Williams .................. 713/201 |
| 2003/0076941 A1 | 4/2003 | Tiliks et al. |
| 2003/0081621 A1 | 5/2003 | Godfrey et al. |
| 2004/0166878 A1 | 8/2004 | Erskine et al. |

(Continued)

FOREIGN PATENT DOCUMENTS

EP    1 670 270 A1    6/2006

(Continued)

OTHER PUBLICATIONS

"New Parental Control Gateway from ZyXEL Provides Easy Solution for Safe Home Internet Surfing", Business Wire. Wednesday, Jun. 30, 2004.

(Continued)

*Primary Examiner*—Vincent P Harper
*Assistant Examiner*—Fred A Casca
(74) *Attorney, Agent, or Firm*—Sonnenschein Nath & Rosenthal LLP

(57) ABSTRACT

Consumer configurable mobile communications solution enabling policy-enforcement services allowing authorized users to define, manage and enforce restrictions for voice, data, and mobile Web services of a secondary mobile device.

13 Claims, 6 Drawing Sheets

U.S. PATENT DOCUMENTS

| | | | |
|---|---|---|---|
| 2004/0194149 A1* | 9/2004 | Kessler | 725/134 |
| 2004/0260801 A1* | 12/2004 | Li | 709/223 |
| 2005/0086313 A1* | 4/2005 | Lucas et al. | 709/206 |
| 2005/0096009 A1 | 5/2005 | Ackley | |
| 2005/0097595 A1 | 5/2005 | Lipsanen et al. | |
| 2005/0113130 A1 | 5/2005 | Weinzierl | |
| 2005/0138416 A1 | 6/2005 | Qian et al. | |
| 2005/0245236 A1 | 11/2005 | Servi et al. | |
| 2005/0259618 A1 | 11/2005 | Ahya et al. | |
| 2005/0260973 A1 | 11/2005 | Van de Groenendaal | |
| 2005/0282559 A1* | 12/2005 | Erskine et al. | 455/456.4 |
| 2006/0047634 A1 | 3/2006 | Aaron et al. | |
| 2006/0094400 A1 | 5/2006 | Beachem et al. | |
| 2006/0190402 A1* | 8/2006 | Patron et al. | 705/51 |
| 2006/0209809 A1 | 9/2006 | Ellingham et al. | |
| 2006/0242309 A1 | 10/2006 | Damick et al. | |
| 2006/0251229 A1 | 11/2006 | Gorti et al. | |
| 2006/0276226 A1 | 12/2006 | Jiang | |
| 2006/0280150 A1 | 12/2006 | Jha et al. | |
| 2006/0293057 A1 | 12/2006 | Mazerski et al. | |
| 2007/0061211 A1 | 3/2007 | Ramer et al. | |
| 2007/0111726 A1 | 5/2007 | Lambert et al. | |
| 2007/0142041 A1 | 6/2007 | Wood | |
| 2007/0169169 A1 | 7/2007 | Zheng et al. | |
| 2007/0198834 A1 | 8/2007 | Ksontini et al. | |
| 2007/0201665 A1* | 8/2007 | Kocan et al. | 379/201.02 |

FOREIGN PATENT DOCUMENTS

| | | |
|---|---|---|
| EP | 1 798 659 A1 | 6/2007 |

OTHER PUBLICATIONS

"ProQuent Unveils World's First Solution for Policing Mobile Content-ProQuent Access Mobile Enables Network Operators to Filter out and Control Access to Inappropriate, Indecent and Offensive Content", Business Wire. Tuesday, Feb. 17, 2004.

darkreading Risky Business; "AppGate Adds Web Filter; AppGate has developed a way to secure and filter web traffic from smartphones by routing traffic through the AppGate server;" p. 1, Feb. 6, 2007, Stockholm. Copyright@2000 CMP Media LLC.

Sep. 9, 2007; "AT&T Rolls Out New Web-Based Parental Control Feature for Wireless Service;" pp. 1-2; Copyright 2007 Wireless News.

Yahoo! Tech; Advisors Daily, real-world advice without the jargon. Get Updates: Parental Control Options: Part 2, Thursday, Jan. 25, 2007; pp. 1-3.

Marcos Forte et at., "A content classification and filtering server for the Internet". *SAC '06*, Apr. 23-27, 2006, Dijon, France, pp. 1166-1171.

Sten A. Lundesgaard, et al., Service Plans for Context- and QoS-aware Dynamic Middleware; *Simula Research Laboratory*; Abstract, pp. 1-6.

Ram Gopal et at., Nokia Research Center, User plane Firewall for 3G Mobile Network, pp. 2117-2121.

Wolfgang Bohm et al., Munich Germay, "Policy Based Architecture for the UMTS Multimedia Doman", pp. 1-11.

VeriSign® Mobile Control Services; pp. 1-3.

Ed Ogonek, "Parental Control in a Mobile Phone World"; WirelessWeek—Jun. 15, 2006; p. 1.

M.M. Mahmoud et al., "Evaluation of Rotor Conducting Screens on the Single-Phase Switched Reluctance Machine", p. 1; School of Engineering and Physical Sciences, Heriot-Watt University Riccarton, Edinburgh, Scotland, United Kingtdom.

Hua Wang et al., Department of Maths &Computing, University of Southern Queensland; Toowoomba, QLD 4350 Australia; Ubiquitous Computing Environments and Its Usage Access Control;: pp. 1-10.

Ron Shacham et al., Columbia University; "Ubiquitous Device Personalization and Use: The Next Generation of IP Multimedia Communications"; ACM Transactions on Multimedia Computing, Communications and Applications, vol. 3, No. 2., Article 12, Publication Date: May 2007; pp. 1-20.

Cisco Systems; Corporate Headquarters; Cisco Wireless IP Phone 7920 Release Notes for Firmware Release 2.0; Copyright 2005 Cisco Sytems, Inc . . . pp. 1-20.

Ashraf Khalil et al., Department of Computer Science, Indiana University, 150 W. Woodlawn Ave., Bloomington, IN 47405; "Context-aware configuration: A study on improving cell phone awareness;" pp. 1-13.

* cited by examiner

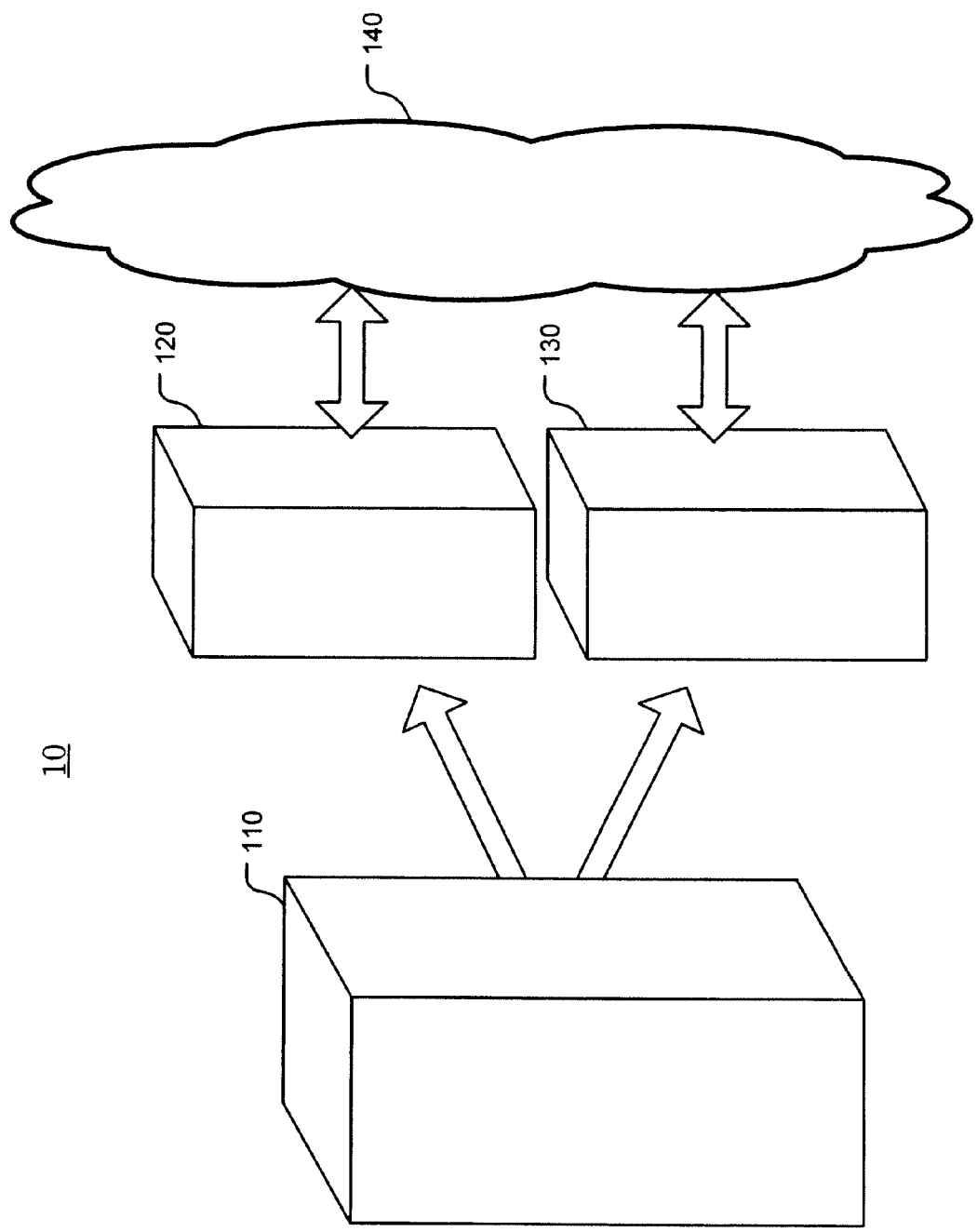

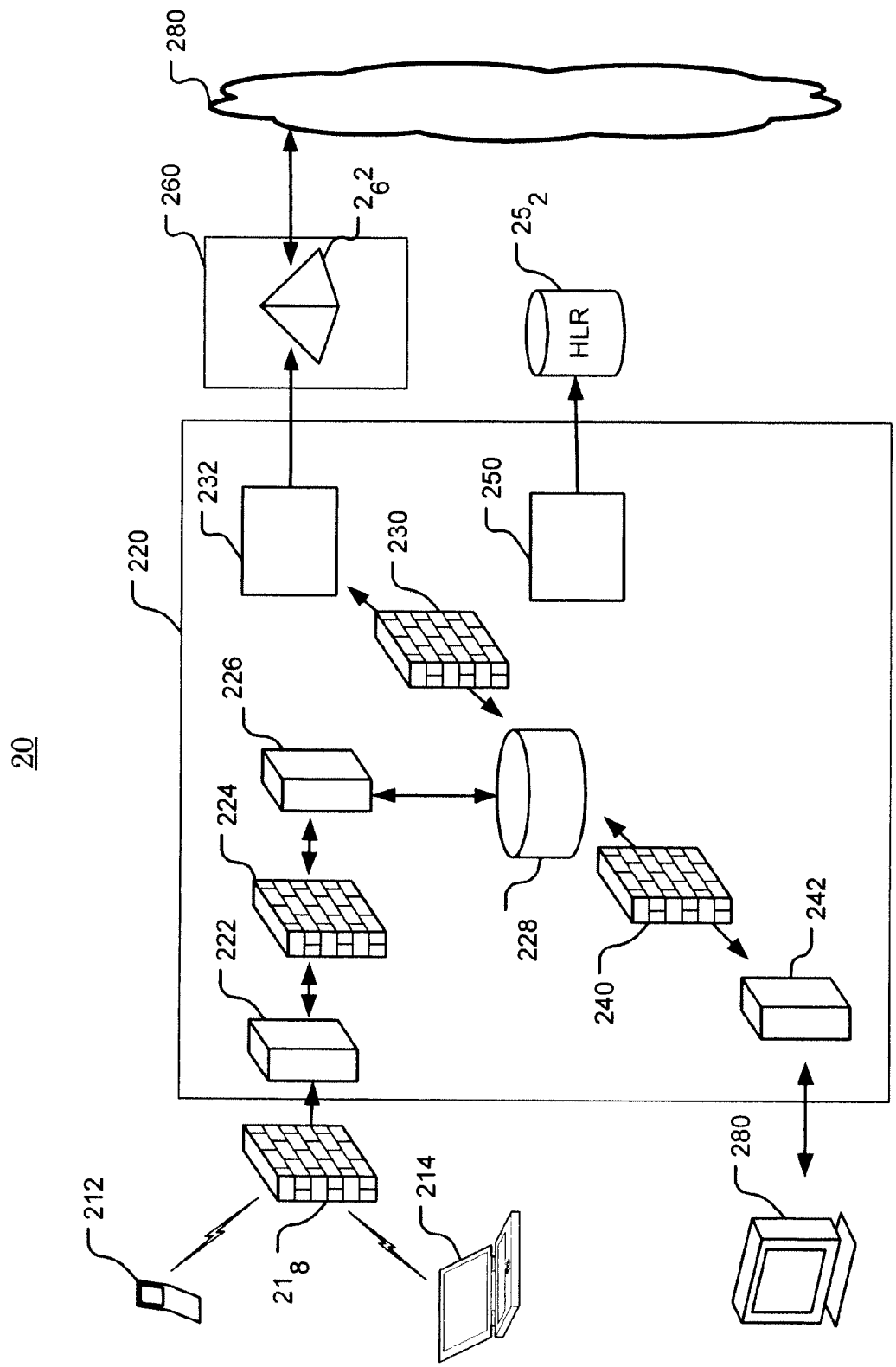

CONSUMER CONFIGURABLE MOBILE COMMUNICATION SOLUTION

CROSS REFERENCE TO RELATED APPLICATIONS

This application is a continuation application of U.S. patent application Ser. No. 11/516,576 filed Sep. 7, 2006, which application in turn claims benefit of U.S. Provisional Application No. 60/714,287 entitled "CONSUMER CONFIGURABLE MOBILE COMMUNICATION SOLUTION" and filed Sep. 7, 2005, U.S. Provisional Application No. 60/725,281 entitled "CONSUMER CONFIGURABLE MOBILE COMMUNICATION SOLUTION" and filed Oct. 12, 2005, U.S. Provisional Application No. 60/735,837 entitled "CONSUMER CONFIGURABLE MOBILE COMMUNICATION SOLUTION" and filed Nov. 14, 2005, and U.S. Provisional Application No. 60/842,703 entitled "CONSUMER CONFIGURABLE MOBILE COMMUNICATION SOLUTION" and filed Sep. 7, 2006, which are hereby incorporated by reference.

BACKGROUND OF THE INVENTION

1. Field of the Invention

The present invention relates to a system and method for a consumer configurable mobile communication solution, and more particularly, to a system and method for configuring the usage criteria of one or more mobile communication devices by user.

2. Discussion of the Related Art

Mobile communication devices have become prevalent in business and home use. Despite the abundance of devices, however, there are few ways of individually restricting the usage of each device or a group of devices within a master account. Typically it is left up to the individual carrying the device to use it as requested by a supervisor (e.g., a manager or parent) supplying the device.

Current methods of restricting mobile device usage include prepaid mobile plans or restricted handsets. A prepaid plan limits how often an individual can use a device; however, it does not restrict, for example, when or to whom a call is made, from whom a call is received, or what web or multimedia use is acceptable. The limits of a prepaid plan are also typically defined by a phone company, not the person owning or managing the phone. Furthermore, prepaid plans are typically managed as a single device, as opposed to a group plan where multiple devices would be obtained and managed under one account. Accordingly, each device is managed as a single account with its own bill and control over the device is limited to the user of the device's willingness to abide by rules set out by that user's supervisor.

Restricted handsets may also be used to limit mobile use. However, few such handsets are available on the market. Handsets that are currently available are typically geared toward very young users, which has earned them the commonly used title of "kiddie phones." Restricted handsets typically only allow a user to dial, and in some configurations receive calls from, specific phone numbers entered into the devices configuration. For example, a parent would typically enter specific phone numbers into the handset's password protected "phonebook." The child would then be able to dial only those numbers available in the phonebook. Such devices may not even have a dialing pad with which to call a specific number not available in the device's phonebook. Such a device would clearly have limited appeal to an adult and much less to a child as he or she grows older and becomes increasingly subject to the peer pressure of adolescence.

Additionally, there are no options to configure the device to allow calls to certain numbers on specified days or timeframes, or to limit calls to a specified talk time, for example. Furthermore, as the changes are made directly to the device, the phone must be present for any modifications to the phonebook.

Restricted handsets are also typically sold as temporary or "pay as you go" devices. As such, the device is typically not associated with a contract or account, thus limiting a supervisor's ability to review the time usage of the device. Time is simply added to the device through the purchase of refill cards or other time purchase mechanisms.

These and other deficiencies exist with conventional mobile communication systems and methods of operation. Therefore, a solution to these and other problems is needed, providing a user configurable system and method specifically designed to configure usage restrictions of one or more mobile communication devices.

SUMMARY OF THE INVENTION

Accordingly, the present invention is directed to a consumer configurable mobile communication solution providing the ability to configure device usage restrictions for one or more mobile communications devices.

The present invention provides a system and method for configuring mobile services for one or more mobile devices, such as cell phones, pagers, and wireless e-mail devices, for example, by a primary user of a mobile communications account containing the user devices. According to the present invention, one or more individuals would be identified as the primary users of the account, such as a parent in a family plan, or a manager in an enterprise plan, for example. According to an embodiment of the present invention, a primary user may configure usage restrictions, such as the time of day a device may be used, the phone numbers a device may call, the services that may be accessed, or geographical limitations, among others, for the one or more secondary user devices by accessing a configuration interface. In a further embodiment, groups may be configured with usage restrictions, wherein devices may be assigned to the group inheriting the group's restrictions. The configuration interface may be a graphical interface via a network connection, a menu interface providing selections available via a telephone, or any other interface allowing configuration of the secondary user devices. Furthermore, configuration is dynamic allowing a primary user to make changes to a secondary user's device at anytime of day or night without the need for a device to be present.

Additional features and advantages of the invention will be set forth in the description that follows, and in part will be apparent from the description, or may be learned by practice of the invention. The objectives and other advantages of the invention will be realized and attained by the structure particularly pointed out in the written description hereof, as well as the appended drawings and appendices.

It is to be understood that both the foregoing general description and the following detailed description are exemplary and explanatory.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 1 shows a component view of a consumer configurable mobile communications system, according to an embodiment of the present invention;

FIG. 2A shows a detailed view of a system providing a consumer configurable mobile communications system, according to an embodiment of the present invention;

DETAILED DESCRIPTION OF VARIOUS EMBODIMENTS

Figure 2B:
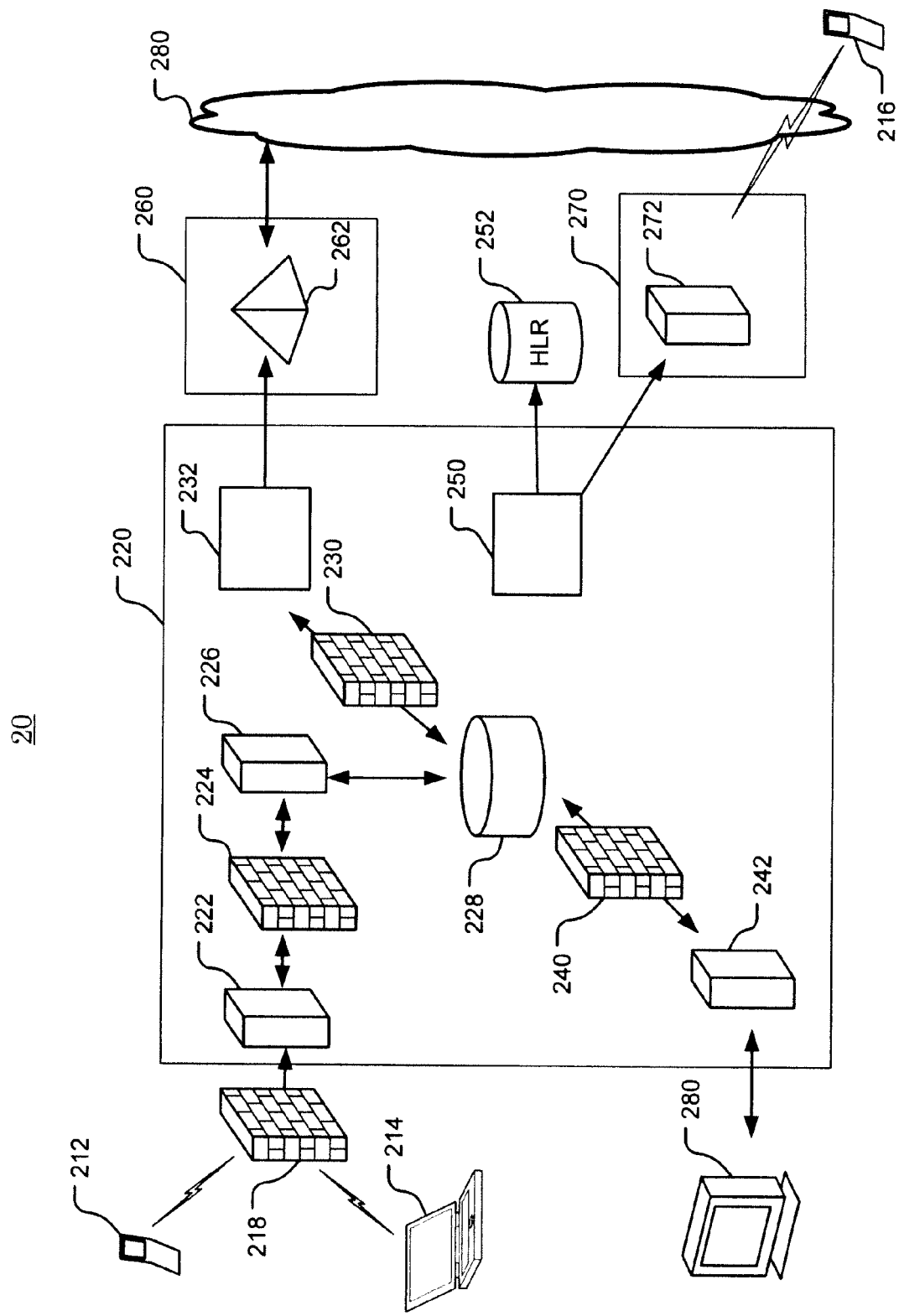
FIG. 2B shows a detailed view of a system providing a consumer configurable mobile communications system including media provisioning, according to an embodiment of the present invention.

Reference will now be made in detail to various embodiments of the present invention, examples of which are illustrated in the accompanying drawings.

FIG. 1 shows a component view of a consumer configurable mobile communications system, according to an embodiment of the present invention. Turning to FIG. 1, the configurable mobile communications system includes a patrol module 110, a control module 120, and a media module 130. According to one embodiment, the patrol module 110, control module 120, and media module 130 are servers configured to provide the functionality of the present invention. In further embodiments, the servers may be contained within a single physical computer server or distributed across a network.

The patrol module 110 provides a user interface, such as a web interface, to allow a primary user to access and configure device restrictions for secondary users associated with a group account including primary and secondary user devices. The patrol module 110 also provides a service management system (SMS) for forwarding configuration data to a control module 120 for updating service control point (SCP) devices used to enforce the user service policies over a signaling network 140, and thus determining how a call should be handled for a particular device. The patrol module 110 also maintains a master record for all configuration data for the user configurable mobile communications service provided by the present invention. The patrol module 110 also provisions other operation support systems (OSS) and network elements (NE), such as providing information to a home location register (HLR) and updating billing information, for example. The patrol module 110 is also responsible for generating reports and usage reports, such as call detail records, ratings, and various other reports. Furthermore, patrol module 110 provides administration capabilities, such as system administration, setting of privileges, and the adding of accounts, among others.

Control module 120 interconnects with and receives service management information from patrol module 110. Control module 120 provides SCP functionality, thus enforcing call control through the signaling network 140 based on the service management information received from patrol module 110. Call control may include allowing or blocking calls, or routing special requests to service nodes (SN) or through an intelligent peripheral (IP).

Protocols used for call control enforcement may differ in various embodiments depending on the type of mobile network used. For example, in pre-Intelligent Network (IN) mobile networks, call control may be implemented via ISDN User Part (ISUP) protocol or Release Line Trunking (RLT) over an SS7 network. For CDMA mobile networks, call control may be implemented via Wireless Intelligent Network (WIN) protocols over an SS7 network. In GSM mobile networks, call control may be implemented via Customized Applications for Mobile networks Enhanced Logic (CAMEL) over an SS7 network. Call control for IP and next generation mobile networks using IP Multimedia Subsystem (IMS) may be implemented via Session Initiation Protocol (SIP) over an IP network. In older IP networks, H.323 may also be used. Call control for other converged networks may be implemented via OSA/Parlay over an IP network. It will be clear to one skilled in the art that as technology changes, other protocols may be used. However, the service specification of the present invention is independent of the underlying call control protocols in use.

Media module 130 interconnects with patrol module 110 and provides interactive voice response (IVR) service or other information services, such as text or multi-media messages, to a mobile device using the services provided by the present invention on the signaling network 140, thus creating an intelligent peripheral. The media module 130 provides device or account information to alert the user of the device of restriction issues or other service information. For example, in one embodiment, IVR services announce low credit, restricted time or number information, among other notifications. According to various embodiments, information or service announcements provided through the media module 130 may be sent to a primary or secondary user's device, or both. In a further embodiment, an IVR self-care service may be provided to a device to allow the user to interact with the service, thus enabling various maintenance services.

FIG. 2A shows a detailed view of a system providing a user configurable mobile communications system, according to an embodiment of the present invention. System 20, as shown in FIG. 2A, includes a patrol module 220 and control module 260. A primary user may interconnect with patrol module 220 via any communications device configured to access patrol module 220, such as mobile phone 212 or computer 214, through a network connection. Through this connection a primary user is able to configure secondary devices included in their mobile communications account or add secondary devices to their account. In a further embodiment, the primary user may add one or more devices to the primary user's account.

In a further embodiment, a primary user's configuration activity is logged to assist a customer service representative in with any future intervention. For example, whenever a primary user logs in the date, time, and login name are recorded. Whenever a primary user makes changes to the configuration, the date and time, login name, function performed (e.g., added time period, deleted contact, etc) is logged.

According to an embodiment of the present invention, a customer service representative may also interconnect with patrol module 220 via any communications device configured to manage a primary user's account, including secondary devices associated with the account, such as customer service access point 280. According to the embodiment shown in FIG. 2A, customer service access point 280 interconnects with the patrol module 220 through customer service applications server 242. Customer service access point 280 allows the customer service representative to assist a primary user with any issues that may occur with the primary user's account. Customer service applications server 242 provides customer service applications through the customer service access point 280, which may be used to modify a user's account or data. In a further embodiment, the customer service representative may add one or more devices to the primary user's account.

In a further embodiment, the present invention logs changes made through a customer service representative. For example, whenever an account is created, deleted, or modified the date, time, login name, and account holder information, such as the primary user's mobile number are logged. Whenever a secondary user is added to or deleted from an account the date, time, login name, account holder information, and secondary user information, such as the secondary user's mobile are logged. Whenever a customer service representative makes changes to a primary user's configuration, the date, time, login name, and function performed (e.g., added time period, deleted contact, etc) are logged.

According to an embodiment of the present invention, configuration of the secondary devices includes identifying what phone numbers and other services may be accessed, what time specified phone numbers and other services may be accessed. In a further embodiment, a customer console is provided by the patrol module 220 for the use of the primary user. This interface allows authorized users to manage the restrictions of the secondary users within an account. The customer console is intended for primary users, who are authorized to manage the settings for all users within the account. However, in a further embodiment, secondary users may also have access to the customer console in a read-only mode.

The customer console interface allows authorized personnel to perform the account management operations, such as assign nicknames to the different secondary users; manage time-based restrictions, such as specifying when a secondary user is able to use a particular service; manage usage-based restrictions, such as specifying how much usage a secondary user is able to use a particular service; manage allowed and disallowed parties, such as specifying who can always be called ("white-list") and who can never be called ("black-list"); assigning restrictions to the different secondary users; designate whether a subscriber is a primary user or secondary user; and creation and manage notifications.

In a further embodiment, group and hierarchical management is also provided. In such an embodiment, one or more groups are configured with specific rights and restrictions and secondary user may be assigned to a particular group, thus inheriting the rights and restrictions of the group.

In a further embodiment, geographical limitations may also be available to limit a secondary device's functionality when it is located in specified locations. For example, a primary user may configure a secondary user's device to limit the locations from which or to which a call may be placed. According to various embodiments, such limitations may be made based on an area code or the physical location of the device based on GPS data provided by the device.

In further embodiments of the present invention, a primary user may also restrict web, e-mail, and messaging functionalities in a similar manner. For example, web access may be restricted to specified times or to specified content or web address designations entered by the primary user. E-mail and messaging may be limited to specified times, as well as a specified list of addresses According to another embodiment of the present invention, an administrative console is also provided by the customer service application server 242 through the customer service console 280 for use by a customer service representative working for a service provider. This interface allows authorized personnel to perform various administrative operations, such as the management of customer logins, including new user access and password assignment; the management of primary accounts, including adding, deleting, or modifying an account; and the management of secondary users within a primary account, such as adding or deleting a secondary user.

The administrative console and customer console may be accessed via a variety of mechanisms. For example, web server 222 may provide a customer console and customer service applications server 242 may provide an administrative console. In one embodiment, accessing the management consoles is via web-based GUIs. In such an embodiment, the consoles are designed as web portlets intended for inclusion into a carrier's web portal. This allows the user interface to be made available to users within the existing electronic self-care provided by the carrier for other services. The web portlet may offer assistance in the form of user tips, bubble help, or context-sensitive help in order to assist the user in configuring the account settings.

According to one embodiment, the primary user may use the web interface to assign a name to each secondary user; assign restrictions to each secondary user, such as create and manage white-lists, create and manage blacklists, create and manage time periods, and create and manage usage limits; create contact list for use in white-lists and black-lists, and create time period list for use when managing restricted time periods.

According to a further embodiment, a customer service representative may use a web interface to add, delete and manage accounts; add, delete and manage secondary users within an account; access to a customer console to assist a primary user.

Returning to FIG. 2A, the patrol module 220 provides an instance of the consumer console via web server 222 and may be accessed by a graphical user interface with user device 212 or 214. Communication between patrol module 220 and user device 212 or 214 is monitored by firewall 218 to protect patrol module 220 from destructive communications inadvertently or intentionally sent via user device 212 or 214. According to the embodiment shown in FIG. 2A, after passing through firewall 218, communication from user devices 212 or 214 enters the patrol module 220 through web server 222.

According to an embodiment of the present invention, the primary user may configure time and usage restrictions, or make unrestricted designations. Time period restrictions restrict secondary users from using services within particular time periods. Each service can be restricted independently. By default, a subscriber has no time restrictions defined when first created. There is no limit to the number of time restrictions that may be set.

According to an embodiment of the present invention, a time range is specified by identifying the start and end time for the period. Nicknames may be assigned to these time ranges (e.g., "school hours") to simplify configuration. Time ranges are restricted within a given day, to allow for repeating time ranges across the weekdays, weekends, or all days. Time ranges that span days (e.g., from Monday 8:00 pm to Tue 7:00 am) are input as two time intervals.

Time ranges apply to a particular day, or grouping of days. The user may select from Day of Week (i.e., Sunday, Monday, etc), Weekday, Weekend or All. In one embodiment, calls that start during allowed time periods are automatically terminated if they cross into a restricted time period. In a further embodiment, notifications may be set to warn a user of a pending termination. For example, a five-minute warning may be given five minutes before entering a restricted time period. In a further embodiment, all times are interpreted as the local time zone of where the subscriber's home network location. The time specifications take into account daylight savings adjustments. However, it is acceptable that calls in progress when the daylight savings adjustment occurs may consider only the restrictions in place at the time of the call. (i.e., it does not have to account for daylight savings during the life of the call).

In further embodiments, secondary users may be restricted to using services within a specified usage allowance. These usage limits are defined on a per-service basis. Each service may use different limit units. For example, voice calls are limited in terms of minutes of phone use; text messages and e-mail are limited in terms of the number of messages. Usage limits may be completely independent of the calling plan minutes. In one embodiment, usage limits may be modified as needed by the primary user without restriction. This means that a primary user may add, subtract or zero out usage limits to impact a secondary user's usage. Changing usage limits does not affect the periodic limits (allowance).

As each service is used, the usage allowance is decremented based on usage. Warning messages are played when the usage reaches low thresholds. In general, usage limits are not adjusted whenever a call is disallowed. The following table shows how the usage limits are treated for successful calls, according to an embodiment of the present invention:

| Event/Restriction Type | Adjustment Specification |
| --- | --- |
| Outgoing call while the "unrestricted" indicator is enabled | Unaffected |
| Outgoing call to a whitelist number | Unaffected |
| Outgoing call to an unlisted number | Decremented |
| Incoming call while the "unrestricted" indicator is enabled | Unaffected |
| Incoming call to a whitelist number | Unaffected |
| Incoming call to an unlisted number | Decremented |

An embodiment of the present invention also provides an auto-replenishment function. In such an embodiment, a secondary user may be assigned a per-service attribute defining what the initial value is, as well as how often the value is reset. Reset intervals are defined monthly on an anniversary date (e.g., 200 minutes every 15$^{th}$ of the month), or weekly on a particular day of the week (e.g., 50 minutes every Sunday).

Each secondary user is assigned a usage limit defined on a reset interval (either weekly or monthly). If a new reset interval is reached, and there is still a balance in the usage allowance, there is a question as how to deal with this balance. Is it discarded (i.e., "use or lose") or is carried over into the next interval ("rollover"). For flexibility, an embodiment of the present invention may also provide a rollover facility. In one embodiment the rollover facility provides the following:

| Field | Value | Comment |
| --- | --- | --- |
| Reset interval | Either weekly or monthly | When values are reset |
| Reset anniversary | For monthly resets date of month For weekly resets day of week | Anniversary of when values reset |
| Initial Value | | Value assigned at the start of each reset interval |
| Rollover maximum value | | Amount of remaining balance that is added to next interval. Anything over this maximum value is lost. To disallow rollovers, set this value to zero (0). |

In further embodiments of the present invention, a primary user may restrict usage to specified contacts. A blacklist is a list or register of people who, for one reason or another, are being denied contact. Names and numbers on the blacklist are not allowed to be contacted. Similarly, some numbers may be designed as always reachable. These numbers may be used for emergency contacts, including the primary user, for example. Names and numbers on the white-list are always allowed to be contacted, even during restricted times, or when the usage limits are exceeded. In one embodiment, calls to/from a white-listed number do not decrement the usage allowance. In a further embodiment, the present invention would always allow white-listed calls and block blacklisted calls, whether they are outgoing and incoming calls. In a further embodiment, numbers not present on either the white-list or blacklist are allowed, but subject to other restriction definitions (e.g., time periods, usage limits, etc). Contacts (i.e., phone numbers) cannot be listed on both the white-list and the blacklist simultaneously.

In a further embodiment, nicknames may be assigned to mobile phone numbers in a contact list (e.g., "Mom," "Dad," "Grandma") to simplify populating the blacklist and white-lists. A defined contact need not be present in either the blacklist or the white-list.

According to further embodiments, an "unrestricted" setting will override all settings for a particular secondary user without having to change any of the current restrictions and allowing the primary user to re-enable them at a subsequent time. In a further embodiment, usage limits are unaffected if the subscriber is designated as unrestricted.

The order in which restrictions are implemented may result in some settings overriding other restrictions. The following order of evaluation is used in one embodiment to determine whether services are allowed or blocked.

| Priority | Restriction | Comment |
| --- | --- | --- |
| 1. | Unrestricted subscriber designation | Subscribers who are classified as unrestricted are treated as if they have no restrictions. |
| 2. | White list designation | Numbers listed in the white list may be reached even if it is a restricted period, or usage limits have been exceeded. |
| 3. | Black list designation | Numbers listed in the blacklist are never reachable. |
| 4. | Time | |
| 5. | Usage | |
| 6. | Content filter | For data services only |

Returning to FIG. 2A, configuration information provided by the user through the user interface is then passed through firewall 224 to applications server 226. Applications server 226 provides the applications and services associated with the patrol module 220, including device configuration, reporting, billing, and system administration. Applications server 226 interconnects with patrol database 228. Patrol database 228 maintains a master record of all configuration information for the patrol module 220 and provides data to the applications server 226, server management systems module 232, and customer service application server 242.

Data transferred between patrol database 228 and service management module 232 moves through firewall 230. Data transferred between patrol database 228 and the customer service applications server 242 moves through firewall 240. Firewalls 230 and 240 protect patrol database 228 from malicious or corrupt information passed by the service management module 232 or customer service applications server 242 to protect the security and integrity of these elements of the patrol module 220.

Service management module 232 provides service management system functionality and is responsible for updating the service control point ("SCP") 262 located within control module 260. Service management module 232 provides network control information to SCP 262 based upon the configuration data provided through the customer console or the administrative console. In turn, the SCP 262 provides service delivery and network control for the devices managed by the primary user and used over communications network 280. Accordingly, the user devices function according to the configuration data maintained in the SCP 262 of the control module 260.

In the embodiment shown in FIG. 2A, the SCP is the network element that receives the triggers from the switch. Patrol module 220 and services management module 260 enforce the configuration as defined by the primary user for managing the usage of secondary user devices managed by the primary user. The functional responsibilities for an SCP according to an embodiment of the present invention are summarized below:

Returning to FIG. 2A, provisioning module 250 updates the information stored on the home location register ("HLR") database 252 for each account. The HLR database 252 maintains subscriber information, such as address, account status, and user preferences, for a mobile communications system.

FIG. 2B, shows a detailed view of a system providing a consumer configurable mobile communications system with media provisioning, according to an embodiment of the present invention. In FIG. 2B, provisioning module 250 interconnects with and provides information to media module 270. Media module 270 receives information from the provisioning module 250 allowing the media module 270 to interact with customer devices and provide a variety of account and device information.

According to one embodiment of the present invention, media module 270 includes an Interactive Voice Response ("IVR") server 272 acting as an intelligent peripheral. Various embodiments of the IVR server 272 support IVR features, DTMF processing, automatic speech recognition ("ASR"), and speech to text/text to speech capabilities, among others. According to one embodiment, IVR features supported by the IVR server 272 include self-care functionality allowing a user to access device accessible maintenance services. Announcements to user devices, such as low credit, restricted times or numbers, may also be provided through the media module 270. In further embodiments, the primary user is able to obtain or set the current balance for any secondary account or set or remove an unrestricted flag for any secondary account.

In further embodiments an ASR interface is provided to allow users to access the management interfaces using existing phones. The IVR plays back menu choices over the phones, and customers can configure the application by speaking responses over the phone. The ASR interface implements the same management options as the IVR interface, but adds speech as the primary user interface rather than touch tones.

In further embodiments, announcements are provided by media module 270. Announcements are audio recordings that are played back during voice calls to inform the affected user of the actions being taken according to a device's current

| Title | Definition | Comment |
|---|---|---|
| Network Attachment | SS7 Point Code in the carriers network | Provides SS7 signaling, triggers and event interfaces |
| Trigger Processing | Receives TCAP messages that are triggers at certain decision points in the call flow. | |
| Event Processing | Sends "events" to notify the switch that a call state should be changed. | Initiated by a message from the Policy Component. |
| Signaling Error Recovery | SS7 error processing | SS7 fault tolerance, fail over, etc. to achieve required level of availability |
| Message Error Recovery | Error recovery due to loss of protocol or other problems in the message traffic or interface to the Policy Component | Message level re-connection, retransmission and re-establishment of context |
| Signaling Component Management | Command and control of the Signaling component itself | Monitoring, restart, shutdown, reconfigure, etc. as requested by the operations staff |
| Active Subscriber State Management | High-level context for each of the active connections. May involve some DB interaction. | The Policy Component maintains historical or "not active" state. |
| Logging and recording | Post to audit, activity and debug logs | Audit records are stored in the database, others written locally. | configuration. In one embodiment, the secondary user is the only device to receive such announcements.

Postpaid and prepaid account may be handled differently. For example, in an embodiment providing postpaid accounts, the managed minutes are associated with the account. When a postpaid threshold is reached (i.e., exceed the total free minutes), a recording indicating that the free minutes has been exceed is played, but the call is allowed to continue. In an embodiment including prepaid accounts, if a call is within the limits of the account settings, but the prepaid account runs out of minutes, nothing is done. The prepaid platform is responsible for detecting this condition and terminating the call. In effect, the present invention is not concerned with changes in the prepaid calling balance.

In a further embodiment, a notification is transmitted to a subscriber to inform them of a significant event. This notification occurs outside of the actual call. For example, a low usage allowance, a zero usage allowance, low total usage limit, a blocked outgoing call, or a blocked incoming call may result in a notification. Notifications may be transmitted to a user-defined contact point. Contact points can be an SMS mobile phone number or an email address.

While it is possible to notify the primary user of each of these events as soon as it is detected, it is probably more appropriate/more convenient to provide a summary notification at the end of each day. In a further embodiment, the same information is made available in the audit logs. This may be provided to the primary user via the web portal.

In further embodiments, each attempted call or session may be recorded on a per-user basis. These are saved to a database and made available to primary users. This allows the user to view a detailed history of calls per user. In the case of blocked calls, these may be the only source of data, because most switches are not configured to generate CDRs when a call is blocked. In such embodiments, a usage record may contain the calling number, the called number or destination URL, the start time, the end time, the type of service {Voice, SMS, MMS, GPRS, WAP, etc.), the call termination status {Normal, Denied Time Period, Denied Zero Balance, Denied Blacklist, Denied Content, Terminated Time Period, Terminated Zero Balance, etc.)

In operation, a primary user may login to their account through a computer device, such as a phone 212 or computer 214. Once logged in, a primary user may view and configure the list of the secondary users associated with the primary users account, view and configure blocked time periods by adding, deleting, or modifying time periods for all secondary users within the account, view and configure a master contacts list by adding, deleting or modifying the information contained in the master contacts list, and view and configure restrictions for specific secondary users. For example, a primary user may view current restrictions placed on a specific device, as well as configure or modify the restrictions on that device. Such restrictions may include time or location limits placed on the device, a blocked time list, an always allow list, or a never allow list.

In a further embodiment, secondary users may be provided with limited access to make modifications to call lists, for example. In such an embodiment, a salesperson may add a new sales contact to their contact list. According to a further embodiment, the new contact information would need to be associated with a project code. In turn, the salesperson's manager would manage the specific restrictions associated with that project code.

In another embodiment of the present invention, geographic limitations may also be configured. For example, a device may be configured to place or receive calls only within a specified area code or country code. In a further embodiment, a device may be configured to place or receive calls only while the device is within a specified area or country code. In another embodiment, a device may be configured to place or receive calls only while the device is within a specified geographic area as defined by GPS coordinates.

Time period definitions may also be set on various restrictions assigned to a specific device. For example, a time period of a week or a month may be designated for various restrictions, such as call or messaging time. Accordingly, a primary user may designate a specific number of minutes allowed for calls during that specified time period. The primary user may also designate the anniversary date, or day within the selected time period that the restriction is reset. For example, a primary user may designate 15 minutes of call or messaging time for use per week and the allotted minutes are to be reset on Sunday. In a further example, a primary user may allot 60 minutes of call or messaging time for use per month wherein the reset date would be the first of the every month. A primary user may also designate rollover limits to allow a specified number of unused minutes to be added to the following months allotment of minutes.

In a further embodiment, a customer service representative, such as an employee or other designated individual or automated mechanism from the wireless operator providing access to the configuration system of the present invention, may create a new account or modify an existing account for a primary user. According to one embodiment of the present invention, a secondary user may only be added by the customer service representative. According to one embodiment, the customer service representative may login in to an account management system. Once in the account management system, the customer service representative may locate an existing account or add a new account. Once an account is available, the customer service representative may edit or delete information associated with the account, such as a primary user's address, phone number, or e-mail address, for example. The customer service representative may also add or modify the list of secondary users identified with the account. Once a secondary user is added to the account, the primary user may modify the restrictions to that secondary user as described above.

Figure 3:
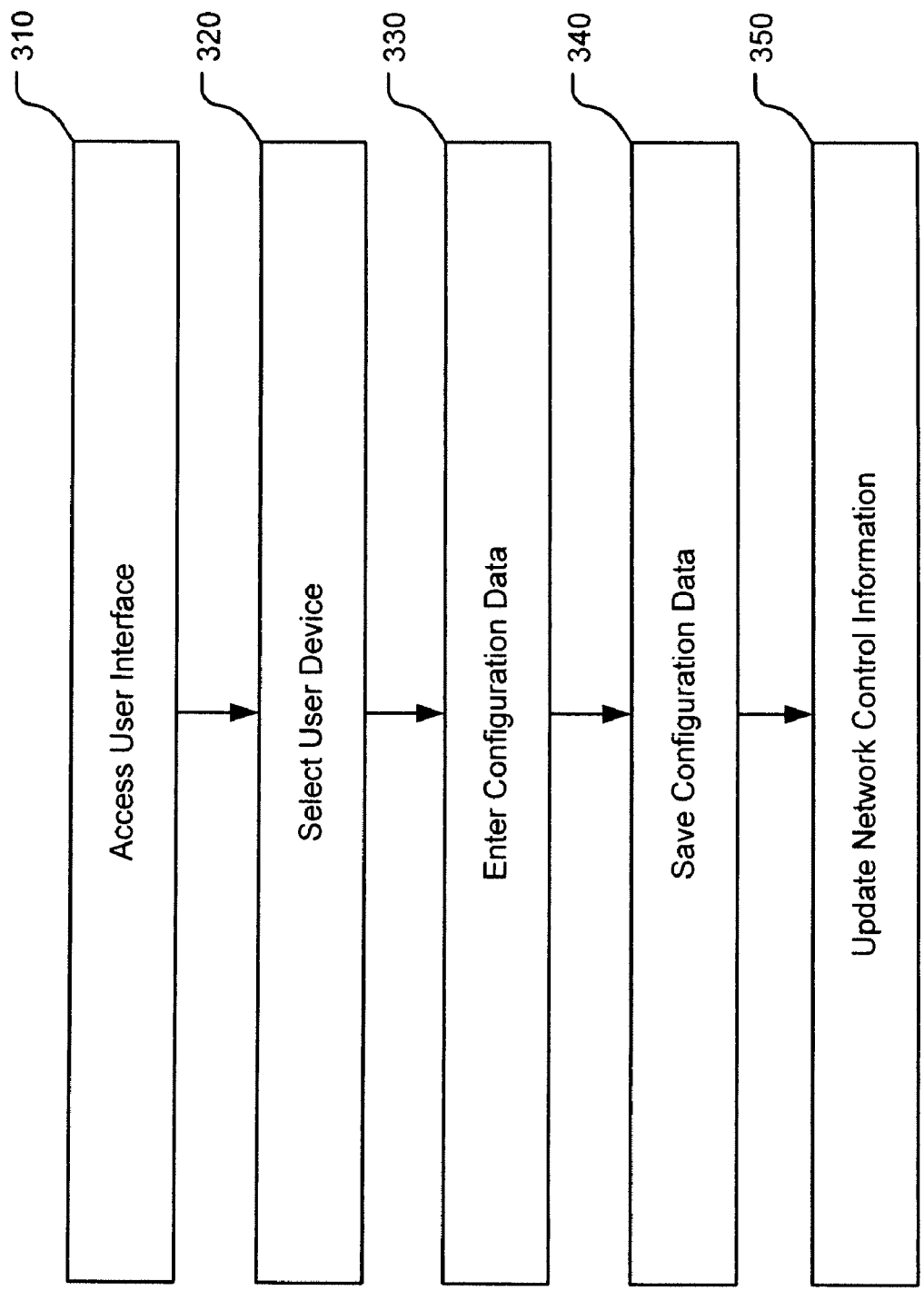
FIG. 3 shows a process flow diagram for configuring a mobile communications user account, according to an embodiment of the present invention.

FIG. 3 shows a process flow diagram for configuring a mobile communications device, according to an embodiment of the present invention. In FIG. 3, a primary user configures a device within a mobile communications account beginning in step 310 by accessing a user interface presented by the mobile communications system. In step 320, a device is selected from available devices. In step 330, configuration information is entered for the selected device. According to an embodiment of the present invention, configuration information may include, for example, phone numbers that the device may always call or never call, phone numbers with specific times that the selected device may call or receive calls from, the time of day or time of week the selected device may be used to make or receive calls from specific numbers, or access to additional services, such as text messaging or Internet access.

After configuration information is entered, the configuration information is saved in step 340. Once the information is saved in step 340 configuration or control data is created and updated in step 350. After the control data has been updated, the user device functions according to the configuration information entered by the primary user for that device.

Figure 4:
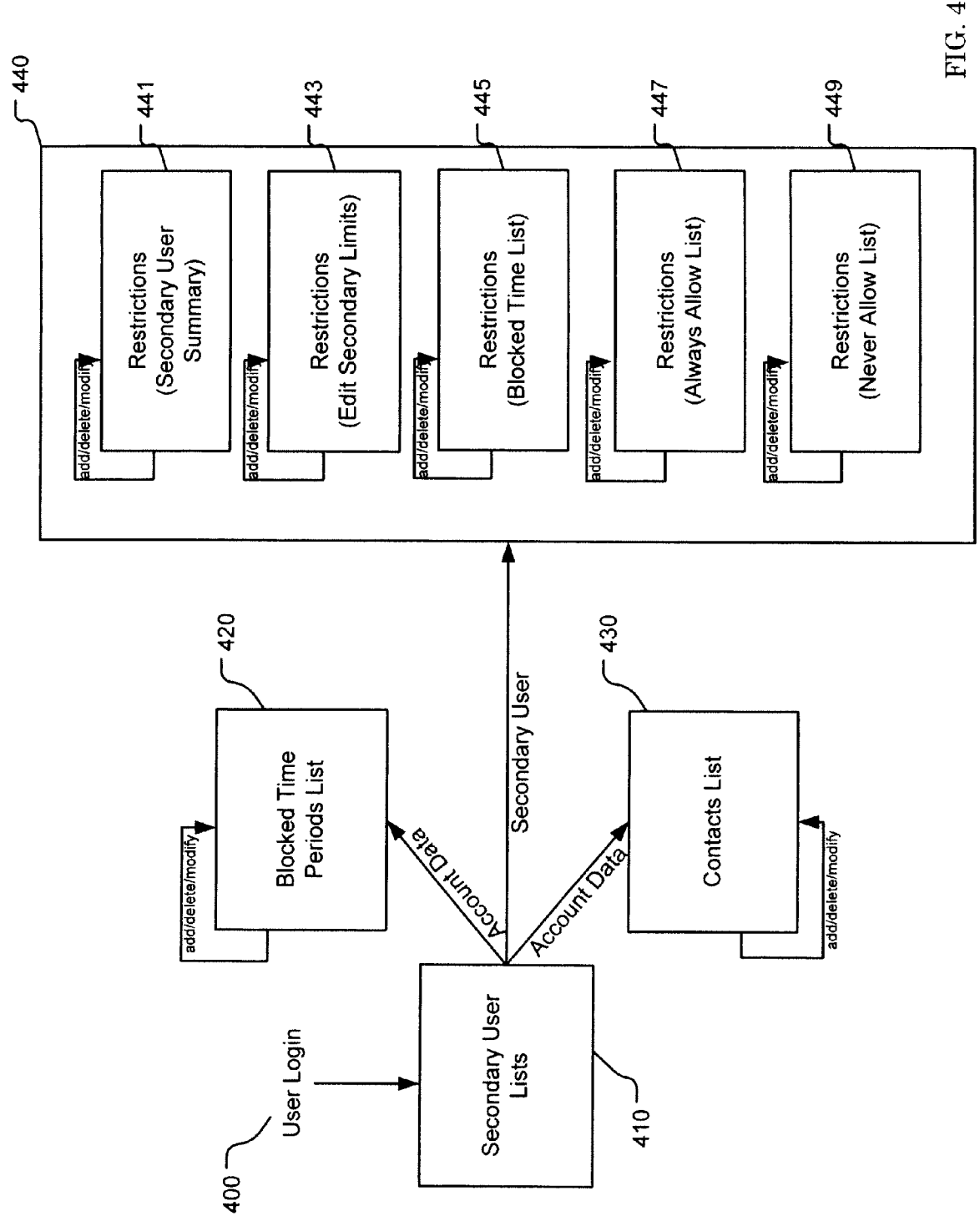
FIG. 4 shows a detailed flow diagram for configuring restrictions for a secondary user account, according to an embodiment of the present invention.

FIG. 4 shows a detailed flow diagram for configuring restrictions, according to an embodiment of the present invention. Configuration begins with a primary user logging in at step 400. At step 410, a secondary user list is provided identifying the secondary users within the account. At step 420, a blocked time periods list is provided where the primary user may add, delete, or modify time periods that may be applicable to one or more secondary users. At step 430, a contacts list is provided where the primary user may add, delete, or modify contact information that may be applicable to restrictions that may be applicable to one or more secondary users.

From the list of secondary users provided at step 410 a primary user may select a user for adding, modifying, or deleting restrictions at step 440. According to the embodiment shown in FIG. 4, the step of adding, modifying, or deleting restrictions may include a secondary user summary step 441, an edit secondary limits step 413, a blocked time list step 445, an always all list step 417, and a never allow list step 449. At secondary user summary step 441, the primary user may review the current setting applied to a selected secondary user. At step 441, the primary user may also add, delete, or modify any of the available settings by selecting a particular setting for modification. At edit secondary limits step 413, the primary user may add, delete, or modify the number of allowed minutes of use for the selected secondary user. A time frame, such as one week or one month may also be designated, as well as a day of the week or month to indicate when the number of minutes should be reset.

At blocked time list step 415, the primary user may add, delete, or modify time periods in which the secondary user may not user their device for specified contacts. According to one embodiment, time periods are selected from the list of blocked time periods created at step 420.

At always allow list step 417, the primary user may add, delete, or modify a list of contacts that may always be called. According to one embodiment, contacts are selected from the list of contacts created at step 430.

At never allow list step 419, the primary user may add, delete, or modify a list of contacts that may never be called. According to one embodiment, contacts are selected form the list of contacts created at step 430.

Figure 5:
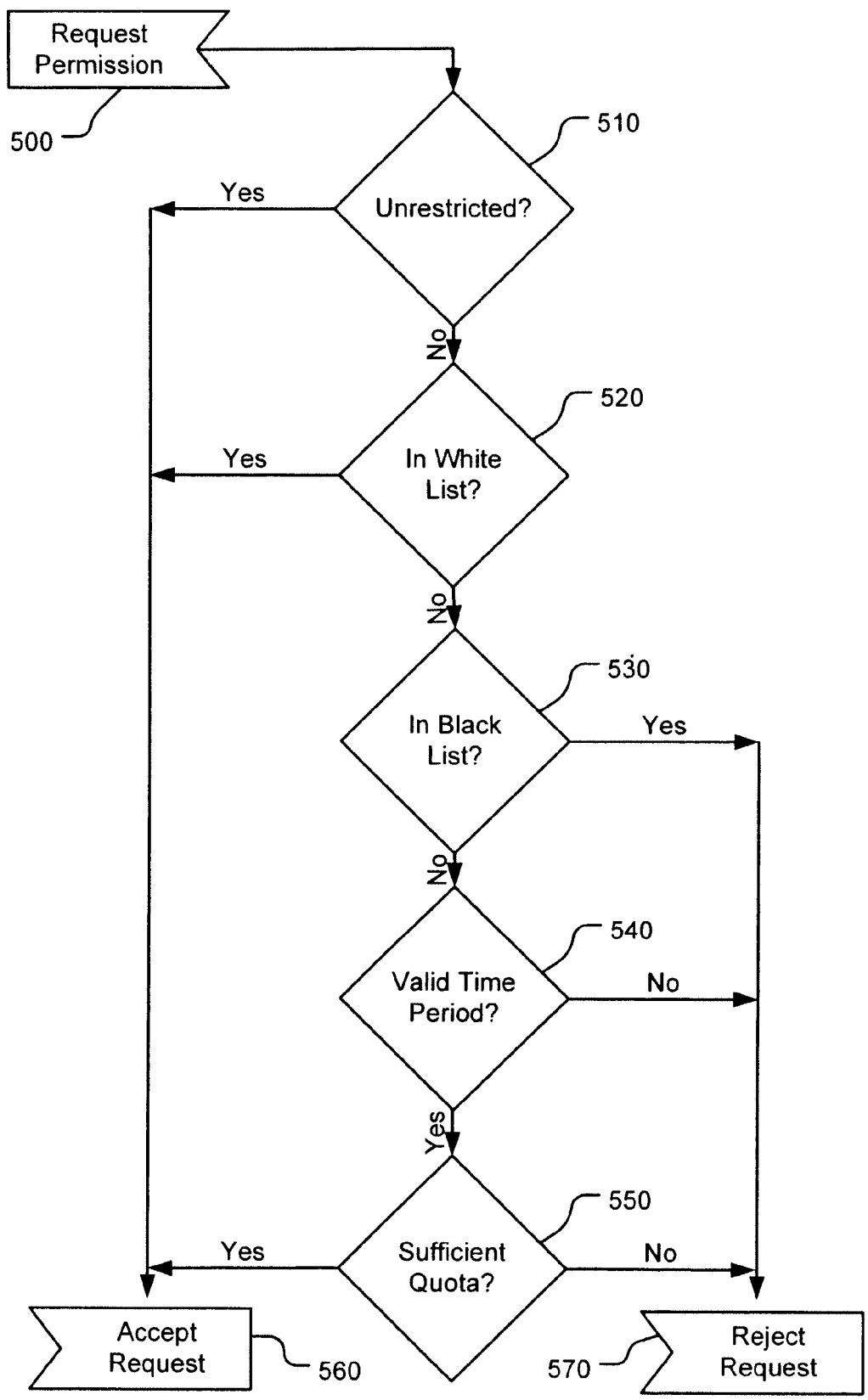
FIG. 5 is a flow diagram showing restriction precedence according to an embodiment of the present invention.

FIG. 5 is a flow diagram showing restriction precedence according to an embodiment of the present invention. The restriction precedence shown in FIG. 5 indicates the order in which restriction checks are made by a device configured according to an embodiment of the present invention. The restriction check begins at step 500 when a request for permission is made. At step 510, the configuration is checked to determine if the current configuration is set to an unrestricted state. If the device is currently set to an unrestricted state the process moves to step 560 where the request is accepted. If the device is not currently set to an unrestricted state, the process moves to step 520.

At step 520, the white or always allowed list is checked to determine if the request indicates a contact identified within the list. If the requested contact is identified on the white list, the process moves to step 560 where the request is accepted. If the contact is not identified on the white list, the process moves to step 530.

At step 530, the black or always deny list is checked to determine if the request indicates a contact identified within the list. If the requested contact is identified on the black list, the process moves to step 570 where the request is denied. If the contact is not identified on the black list, the process moves to step 540.

At step 540, the restricted time periods list is checked to determine if the request is being made during a valid time period. If the request is not being made during a valid time period, the process moves to step 570 where the request is denied. If the request is being made during a valid time period, the process moves to step 550.

At step 550, the remaining allotment of minutes is checked to determine if the device has a sufficient quota of time remaining. If there is a sufficient amount of time remaining, the process moves to step 560 where the request is accepted. If there is not a sufficient amount of time remaining, the process moves to step 570 where the request is rejected.

While various network and technology-based examples have been provided, the present invention is intended to be a network- and technology-agnostic application and is operable in a mobile carrier's network independent of the technology deployed. It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

The invention claimed is:

1. A subscriber-configurable mobile communications system comprising:
   a media module;
   a control module; and
   a patrol module comprising a patrol database and a provisioning module, said patrol module adapted to
      receive configuration information and a definition of at least one notice mechanism from a primary subscriber,
      store the configuration information in the patrol database,
      create configuration data based on the configuration information whenever updates to said configuration information are made, said configuration data defining rules readable by said control module, and
      forward said configuration data to said control module upon updates to said configuration information, said configuration information defining rules for restricting communications by one or more secondary subscribers over the mobile telecommunications system, wherein
   said provisioning module
      is coupled to a home location register of said mobile telecommunications system and to the media module, and
      is adapted to provide said configuration data to said home location register and to said media module;
   said control module is adapted to receive and to store said configuration data forwarded by said patrol module, said control module comprising a service control point that applies said stored configuration data to manage network traffic to and from said one or more secondary subscribers according to said rules; and
   said media module is adapted to provide a notice to said primary subscriber according to said at least one notice mechanism, said notice describing attempted network traffic of said one or more secondary subscribers that violates said rules, wherein said secondary subscribers are permitted to define and submit contacts to said primary subscriber for consideration in defining new rules, and wherein said contacts are associated with a project code by the submitting secondary subscribers.

2. The system of claim 1, wherein the patrol module further comprises: a web server for presenting an interface for the primary subscriber, said primary subscriber utilizing said interface to define, review and modify the configuration information; and an applications server coupled to the web server for managing the configuration information stored in said patrol database.

3. The system of claim 2, wherein said patrol database is further adapted to store records of network traffic of said secondary subscribers.

4. The system of claim 2, wherein said interface enables said primary subscriber to activate an unrestricted setting for a given secondary subscriber that temporarily disables rules that pertain to said given secondary subscriber.

5. The system of claim 2, wherein said rules comprise usage time restrictions over a given period, and wherein said interface enables said primary subscriber to define roll over settings for said secondary subscribers.

6. The system of claim 2, wherein said secondary subscribers can access said interface in a read only mode to view content of said patrol database.

7. The system of claim 1, wherein the patrol module further comprises a service management module for generating configuration data for interconnecting with the control module and forwarding the configuration data to the control module.

8. A method for configuring and controlling the use of a mobile communications device operable over a mobile telecommunications system, said system comprising a media module, a control module, and a patrol module, said method comprising:
  receiving, at the patrol module, configuration information and a definition of at least one notice mechanism from a primary subscriber, said patrol module comprising a patrol database and a provisioning module;
  storing the configuration information in the patrol database;
  creating configuration data based on the configuration information whenever updates to said configuration information are made, said configuration data defining rules readable by said control module said control module comprising a service control point;
  forwarding said configuration data to said control module upon updates to said configuration information, said configuration information defining rules for restricting communications by one or more secondary subscribers over the mobile telecommunications system, wherein said provisioning module is coupled to a home location register of said mobile telecommunications system and to the media module;
  providing said configuration data via said provisioning module to the home location register and to the media module;
  receiving and storing, at the control module, said configuration data forwarded from the patrol module, and applying, at said service control point, said stored configuration data to manage network traffic to and from said one or more secondary subscribers according to said rules;
  providing from the media module, notices to said primary subscriber according to said at least one notice mechanism, said notice describing attempted network traffic of said one or more secondary subscribers that violates said rules;
  receiving a permission request for a specified contact from a given secondary subscriber;
  checking for an unrestricted configuration;
  checking for the contact's inclusion in a white list;
  checking for the contact's inclusion in a black list;
  checking the time of the permission request to be within a valid time period; and
  checking that a minimum quota threshold is met.

9. The method of claim 8, wherein said contact is automatically accepted by said patrol module if an unrestricted configuration applies to said given secondary subscriber or if said contact is included in a white list defined by said primary subscriber, and said contact is automatically rejected by said patrol module if said contact is included in a black list defined by said primary subscriber.

10. The method of claim 8, further comprising activating an unrestricted setting for a given secondary subscriber that temporarily disables rules that pertain to said given secondary subscriber.

11. The method of claim 8, further comprising storing in said patrol database records of network traffic of said secondary subscribers, said records indicating attempted violations of said rules by each of said secondary subscribers.

12. The method of claim 8, wherein said rules can comprise usage time restrictions over a given period, and said method further comprises receiving via said interface from said primary subscriber roll over settings for said secondary subscribers.

13. The method of claim 8, further comprising displaying via said interface said configuration information to said secondary subscribers in a read only mode.

* * * * *